United States Patent
Kim et al.

(10) Patent No.: US 7,414,692 B2
(45) Date of Patent: Aug. 19, 2008

(54) LIQUID CRYSTAL DISPLAY PANEL COMPRISING DATA LINES HAVING ALTERNATELY DIFFERENT EXTENDED LENGTHS TO DATA PADS AT RESPECTIVELY DIFFERENT LEVELS ABOVE THE SUBSTRATE

(75) Inventors: Woo Hyun Kim, Seoul (KR); Hong Suk Yoo, Kyonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/688,920

(22) Filed: Oct. 21, 2003

(65) Prior Publication Data

US 2004/0085504 A1    May 6, 2004

Related U.S. Application Data

(63) Continuation of application No. 10/012,395, filed on Dec. 12, 2001, now Pat. No. 6,700,636.

(30) Foreign Application Priority Data

Dec. 13, 2000   (KR) ...................... 10-2000-0076006

(51) Int. Cl.
   *G02F 1/1345* (2006.01)
(52) U.S. Cl. ...................... 349/149; 349/152
(58) Field of Classification Search ......... 349/149–152, 349/139, 147
   See application file for complete search history.

(56) References Cited

U.S. PATENT DOCUMENTS

| | | | |
|---|---|---|---|
| 4,586,789 A | 5/1986 | Kishimoto et al. | 350/336 |
| 5,019,001 A | 5/1991 | Abe et al. | 445/3 |
| 5,859,679 A | 1/1999 | Song | 349/54 |
| 5,883,682 A | 3/1999 | Kim et al. | 349/43 |
| 5,969,779 A * | 10/1999 | Kim et al. | 349/54 |
| 6,683,669 B1 * | 1/2004 | Fujikawa | 349/149 |

FOREIGN PATENT DOCUMENTS

| | | |
|---|---|---|
| DE | 197 29 774 A1 | 1/1998 |
| DE | 199 30 197 A1 | 1/2000 |
| EP | 0 883 182 A2 | 12/1998 |
| JP | 60-111226 | 6/1985 |
| JP | S61-126226 | 6/1986 |
| JP | 05-150263 | 6/1993 |
| JP | 06-250197 | 9/1994 |
| JP | 07-263700 | 10/1995 |
| JP | 8006060 A | 1/1996 |
| JP | 9-258249 | 10/1997 |
| JP | 2000-162629 | 6/2000 |
| JP | 2000-321591 A | 11/2000 |

* cited by examiner

*Primary Examiner*—Thoi V Duong
(74) *Attorney, Agent, or Firm*—McKenna Long & Aldridge LLP (57) ABSTRACT

An LCD panel of high resolution (with decreased pixel pitch) and a method for manufacturing the same. In the LCD panel, the even numbered data lines are formed only up to the cell region of a substrate and then extended up to the pad region using conductive patterns. With the use of refracted conductive patterns, the even numbered data pads could be extended from the even numbered data lines and arranged parallel to the odd-numbered data pads along the longitudinal direction of odd-numbered data lines, thereby decreasing the pitch. Instead of using the conductive patterns, the even numbered data lines may be made longer than the odd numbered data lines in the pad region and may be refracted appropriately to arrange the even numbered data pads in parallel to the odd numbered data pads along the longitudinal direction of the odd numbered data lines.

17 Claims, 13 Drawing Sheets

LIQUID CRYSTAL DISPLAY PANEL COMPRISING DATA LINES HAVING ALTERNATELY DIFFERENT EXTENDED LENGTHS TO DATA PADS AT RESPECTIVELY DIFFERENT LEVELS ABOVE THE SUBSTRATE

This is a continuation application of application Ser. No. 10/012,395, filed on Dec. 12, 2001 now U.S. Pat. No. 6,700,636, which is incorporated by reference herein in its entirety.

The present invention claims the benefit of Korean Patent Application No. P 2000-0076006 filed in Korea on Dec. 13, 2000, which is hereby incorporated by reference.

BACKGROUND OF THE INVENTION

1. Field of the Invention

The present invention relates to a display device, and more particularly, to a liquid crystal display (LCD) panel of high resolution and a method for manufacturing the same.

2. Discussion of the Related Art

Rapid developments in the field of information communication have caused an increase in the demand for thin, lightweight and low cost display devices for viewing information. Industries that develop display devices (or, simply, displays) are responding to these needs by placing high emphasis on developing flat panel-type displays. Historically, the Cathode Ray Tube (CRT) has been widely used as a display device for televisions, computer monitors and the like, because CRT screens can display various colors having high brightness. However, the CRT cannot adequately satisfy present demands for display applications that require display devices with reduced volume and weight, portability, lower power consumption, large screen size, and high resolution. Because of such requirements, the display industry has started placing more emphasis on developing flat panel displays to replace the CRT. Over the years, flat panel displays have found wide use in monitors manufactured for computers, spacecraft, aircraft, etc.

Some examples of the types of flat panel displays currently in use include the liquid crystal display (LCD), the electroluminescent display (ELD), the field emission display (FED), and the plasma display panel (PDP). Some characteristics that are required of an ideal flat panel display include light weight, high luminance, high efficiency, high resolution, high speed response time, low driving voltage, low power consumption, low cost, and natural color reproduction.

Generally, a phosphor material on a surface of the CRT emits light based on an externally applied display timing signal and an externally applied data signal, which control the trace of an electron beam. On the other hand, in an LCD panel, the electric field applied to the liquid crystals is controlled so as to control each crystal's transmittivity of light.

Development and applications of thin film transistor (TFT)-based LCD displays having increased dimensions and increased resolution is in demand. To increase productivity during manufacture of such displays, it is desirable to continue efforts to simplify manufacturing process steps and to improve the yield.

It is noted that the pitch between two pads in an LCD panel is a parameter that can be optimized for realizing an LCD panel with high resolution. In other words, the realization of an LCD panel with high resolution depends on how much the pitch between two pads is decreased.

Figure 1:
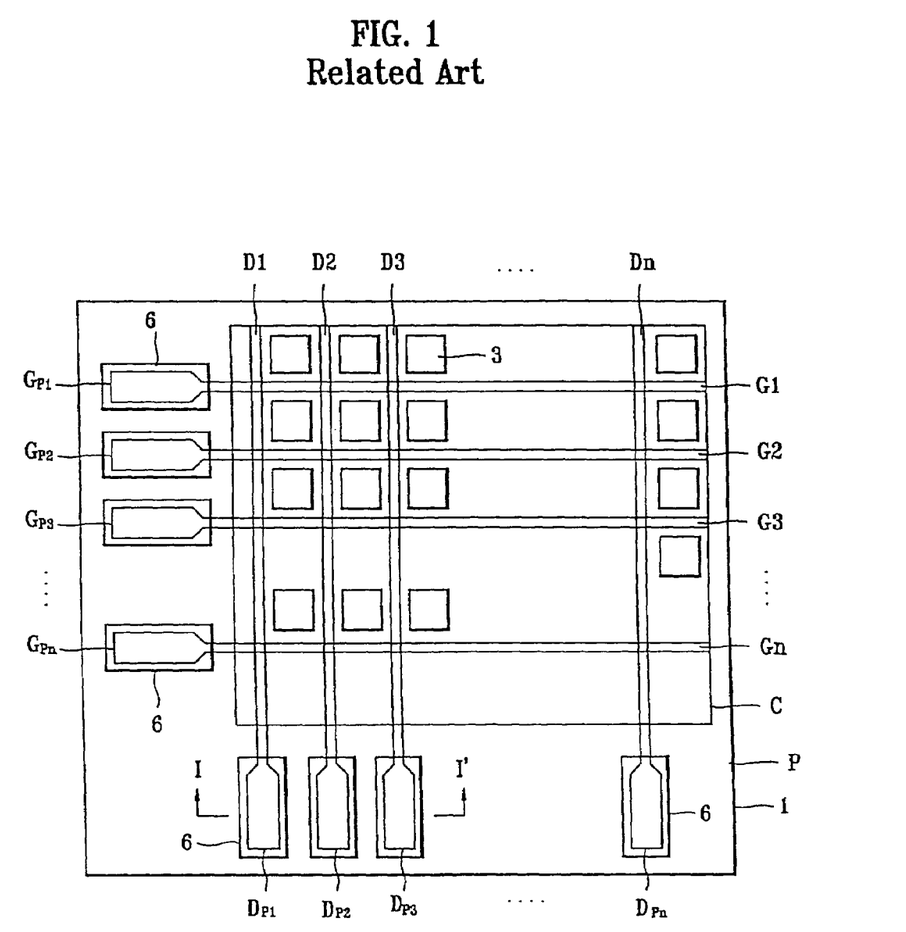
FIG. 1 is a plane view illustrating architectural details of a related art LCD panel.
Figure 2:
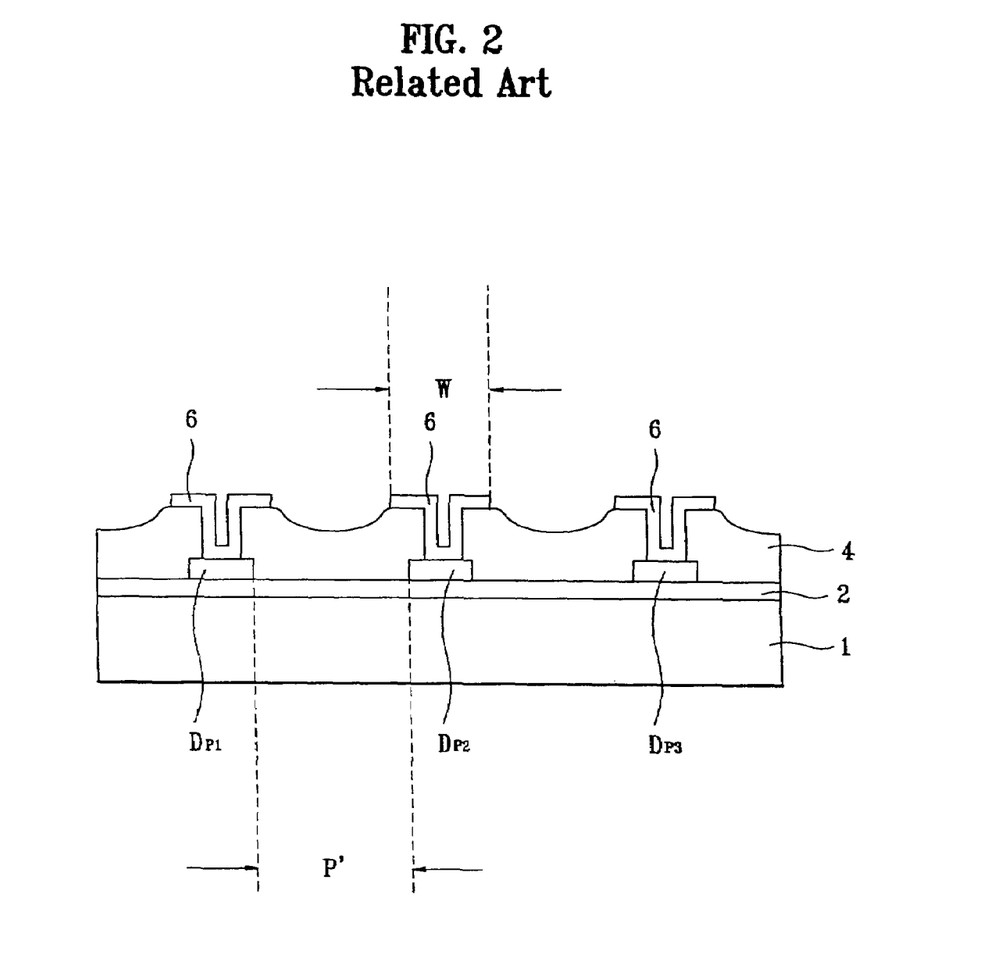
FIG. 2 is a sectional view of the LCD panel in FIG. 1 taken along line of I-I' in FIG. 1.
Figure 3:
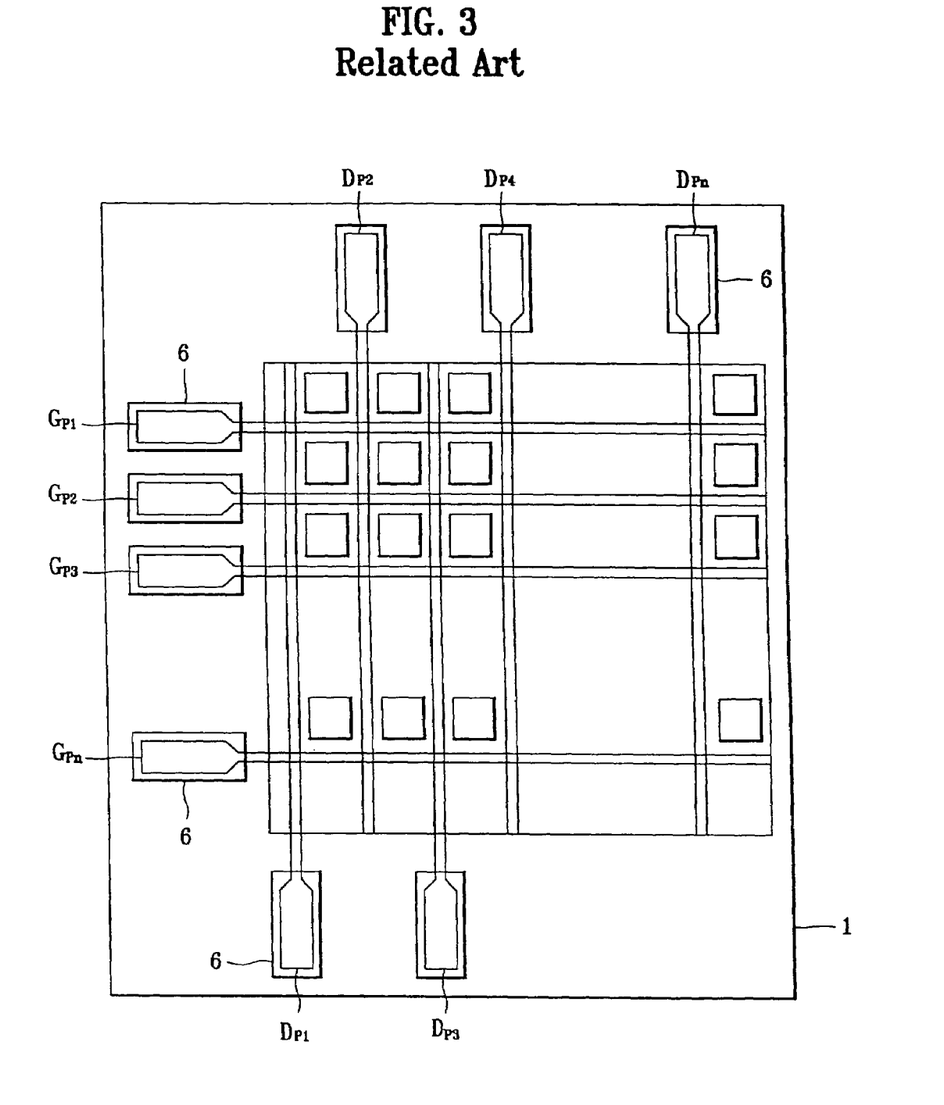
FIG. 3 is a plane view illustrating a related art LCD panel with double bank structure.

Some relevant constructional details of a related art LCD panel are explained hereinbelow with reference to FIGS. 1-3. FIG. 1 is a plane view illustrating architectural details of a related art LCD panel, and FIG. 2 is a sectional view of the LCD panel in FIG. 1 taken along line of I-I' in FIG. 1. Referring to FIG. 1 and FIG. 2, the related art LCD panel includes two glass substrates divided into a cell region (C), a pad region (P), and a liquid crystal interposed between them. A plurality of gate lines G1, G2 . . . Gn are arranged to cross a plurality of data lines D1, D2 . . . Dn on a first glass substrate 1 in the cell region (C), thereby defining a plurality of pixel regions in a matrix form. A pixel electrode 3 is formed in each pixel region. A TFT (Thin Film Transistor) is formed at each crossing point between a gate line and a data line.

The pad region P includes a plurality of gate pads Gp1, Gp2 . . . , Gpn and a plurality of data pads Dp1, Dp2 . . . Dpn. The gate pads transmit a gate signal output from a gate driving circuit (not shown) to the gate lines G1, G2 . . . Gn; and the data pads transmit a data signal output from a data driving circuit (not shown) to the data lines D1, D2 . . . Dn.

Although not shown in FIGS. 1 and 2, a black matrix layer and a color filter layer for displaying colors R, G, and B are arranged on a second glass substrate of the cell region. The black matrix layer prevents light from being transmitted from a pixel electrode and a TFT. A common electrode is arranged above the color filter layer so as to apply a common voltage to each pixel electrode 3.

The data pads are now explained with reference to FIG. 2. As shown in FIG. 2, the data pads Dp1, Dp2, and Dp3 extend from respective data lines D1, D2, and D3 in the cell region C. The data pads Dp1, Dp2 and Dp3 are formed above the gate insulating film 2 on the first substrate 1 in the pad region P with a fixed distance between two of them. Thereafter, a transparent conductive film 6 electrically connected to each data pad Dp1, Dp2, and Dp3 through a passivation film 4 on the data pads Dp1, Dp2, and Dp3 is formed. The transparent conductive film 6 transmits a driving signal received from an external driving circuit (not shown) through TCP (Tape Carrier Package) or COF (Chip on Film) to each data line.

The distance between each data line D1, D2, and D3 is called a "pitch." For example, in FIGS. 1 and 2, the pitch P' is a distance from the center of line D1 to that of line D2. In a related art LCD panel, the pitch P' is about 50 µm and the respective transparent conductive films 6 require a minimum distance "W" to be connected to a Tape Carrier Package (TCP), which electrically connects the transparent conductive films 6 to a driving circuit.

However, to obtain an LCD panel of high resolution, that is, an LCD panel with more than 200 Pixels Per Inch (PPI), the pitch P' should be less than 50 µm (e.g., approximately 42 µm). Accordingly, with the configuration illustrated in FIGS. 1 and 2, an LCD panel of resolution more than 200 PPI may not be obtained.

Many methods to obtain a higher pitch among adjacent data pads are proposed. For example, a Double Bank structure separately arranges pads at both sides of an LCD panel. FIG. 3 is a plane view illustrating a related art LCD panel with double bank structure. In FIG. 3, the odd numbered data pads such as Dp1, Dp3, . . . , Dpn−1 are arranged at a lower portion (or at an upper portion) of an LCD panel and the even numbered data pads such as Dp2, Dp4 . . . , Dpn are arranged at an upper portion (or a lower portion) of the panel, thereby obtaining a pitch that is higher than that obtained with the Single Bank structure shown in FIG. 1. In the cell region of first substrate 1 in FIG. 3, a plurality of gate lines G1, G2 . . . Gn are formed to cross a plurality of data lines D1, D2 . . . Dn. Also, in the pad region of the substrate 1, data pads Dp1, Dp2, Dp3 . . . , Dpn−1, and Dpn on corresponding data lines are alternately arranged at an upper or a lower portion of the LCD panel as shown in FIG. 3.

However, a related art LCD panel has the following problems. First, the Single Bank structure (such as that shown in FIG. 1) can not obtain an LCD panel having a resolution more than 200 PPI, because a Single Bank structure places a limit on decreasing the pitch, which is a distance between adjacent data pads, since a minimum pad width is required for electrical contact with a driving circuit. Second, although the minimum width required for electrical contact with the driving circuit is obtained in the Double Bank structure in spite of a decreased pitch, a separate arrangement of data pads on both sides of the LCD panel is required. Such a Double Bank architecture thus complicates the module fabrication process and driving circuitry arrangement. Furthermore, the double bank structure makes fabrication of compact panels impossible and also increases the LCD panel production cost.

SUMMARY OF THE INVENTION

Accordingly, the present invention is directed to an LCD panel and a method for manufacturing the same that substantially obviate one or more of the problems due to limitations and disadvantages of the related art.

An object of the present invention is to provide an LCD panel of a large area and a method for manufacturing the same, in which a pixel pitch is decreased, and thus an LCD of a high resolution can be obtained.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the objects and other advantages in accordance with the purpose of the invention, as embodied and broadly described herein, an LCD panel according to one embodiment of the present invention includes an insulating substrate defined as a cell region and a pad region; a plurality of gate lines crossing a plurality of data lines, thereby defining a plurality of pixel regions on the cell region; a first set of data pads formed in the pad region and extending from the odd numbered data lines; and a second set of data pads formed in the pad region in a single-bank structure with the first set of data pads. Each data pad in the second set of data pads is electrically connected to a corresponding even numbered data line and arranged in a direction parallel to that of the first set of data pads. Furthermore, each data pad in the second set of data pads is placed in the pad region at a location whose longitudinal axis is collinear with that of an adjacent odd numbered data line.

In another embodiment, the present invention contemplates a method of manufacturing an LCD panel. The method includes forming a plurality of gate lines in a cell region of a substrate and forming a plurality of conductive patterns on the substrate, wherein each conductive pattern has a first end in the cell region and a second end in the pad region; forming a gate insulating film on the substrate covering the plurality of gate lines and the plurality of conductive patterns; forming odd-numbered and even-numbered data lines in the cell region on the gate insulating film, wherein the longitudinal axis of each of the odd-numbered data lines is collinear with the second end of an adjacent one of the plurality of conductive patterns on the substrate; forming a first set of data pads in the pad region extending from the odd-numbered data lines on the gate insulating film above the plurality of conductive patterns; and forming a second set of data pads in the pad region in a single-bank structure with the first set of data pads, wherein each data pad in the second set of data pads is connected at least to the second end of a corresponding one of the plurality of conductive patterns and is arranged in a direction parallel to that of the first set of data pads.

In an LCD panel of the present invention, conductive patterns are connected to the even numbered data lines at the time of patterning the gate lines. These conductive patterns may also be formed of the same material as that of the gate lines and in the same process as that used to form the gate lines. Thereafter, a gate insulating layer, data lines, and a passivation film are formed sequentially. Then, a semiconductor layer which is to be used as a channel of a thin film transistor is formed. The source and drain electrodes are also formed at the time of forming the data lines.

The passivation film and the gate insulating film may be patterned at the same time. Then, appropriate contact holes are formed to expose an end part (in the pad region) of the odd numbered data lines, an end part (in the cell region) of the conductive patterns, an end part of even numbered data lines adjacent to the end part of the conductive patterns in the cell region, and an opposite end part (in the pad region) of the conductive patterns. Subsequently pixel electrodes are formed in pixel regions, and a transparent conductive film connected to the odd numbered data lines is formed through corresponding contact hole to form the first data pads (i.e., the odd-numbered data pads). At the same time, a transparent conductive film which connects the end part of the conductive patterns to the end part of adjacent even numbered data lines is formed. Also, a transparent conductive film connected to the opposite end part of the conductive patterns is formed, thereby forming the second data pads (i.e., the even-numbered data pads).

As per one embodiment of the present invention, the even numbered data lines are formed only up to the cell region and then extended up to the pad region using the conductive patterns. The conductive pattern extensions of the even numbered data lines pass through a lower portion of the first data pads. On the other hand, in another embodiment of the present invention, the conductive patterns are placed on one side of the first data pads and no portion of the conductive patterns is placed perpendicularly below the first set of data pads. These conductive patterns may be formed with gate lines, and refracted appropriately so that the even numbered data pads could be extended from the even numbered data lines and arranged parallel to the odd-numbered data pads along the longitudinal direction of odd-numbered data lines.

In another embodiment of the present invention, the conductive patterns are not formed, but, instead, the even numbered data lines are made longer than the odd numbered data lines in the pad region of the substrate. The even numbered data lines may be refracted appropriately to arrange the even numbered data pads in parallel to the odd numbered data pads along the longitudinal direction of the odd numbered data lines. Therefore, the first and second sets of data pads are arranged not adjacent but alternately up and down on a plane.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principles of the invention. In the drawings.

DETAILED DESCRIPTION OF PREFERRED EMBODIMENTS

Reference will now be made in detail to the preferred embodiments of the present invention, examples of which are illustrated in the accompanying drawings.

First Embodiment

Figure 4A:
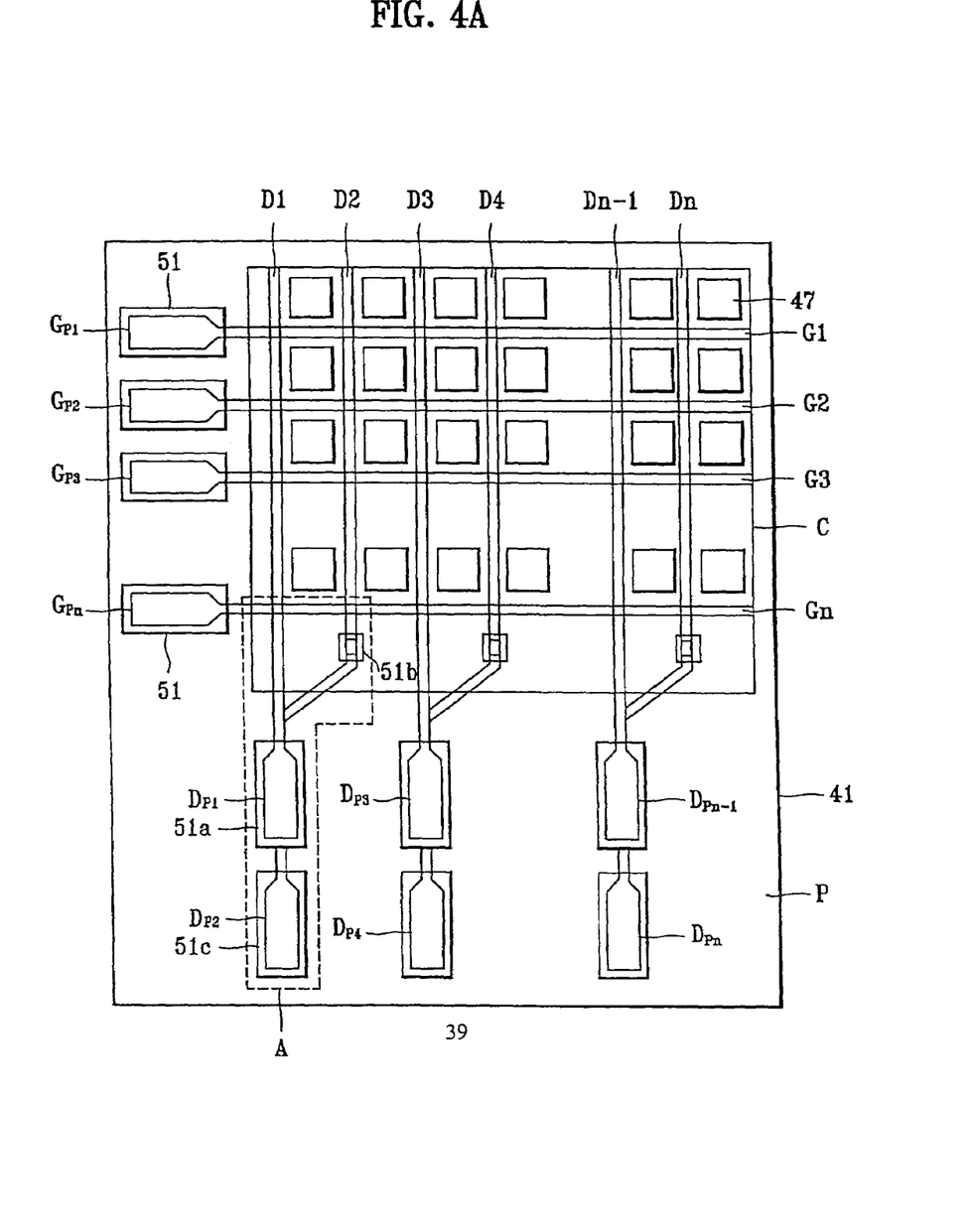
FIG. 4A illustrates a plane view of an LCD panel according to a first embodiment of the present invention.
Figure 4B:
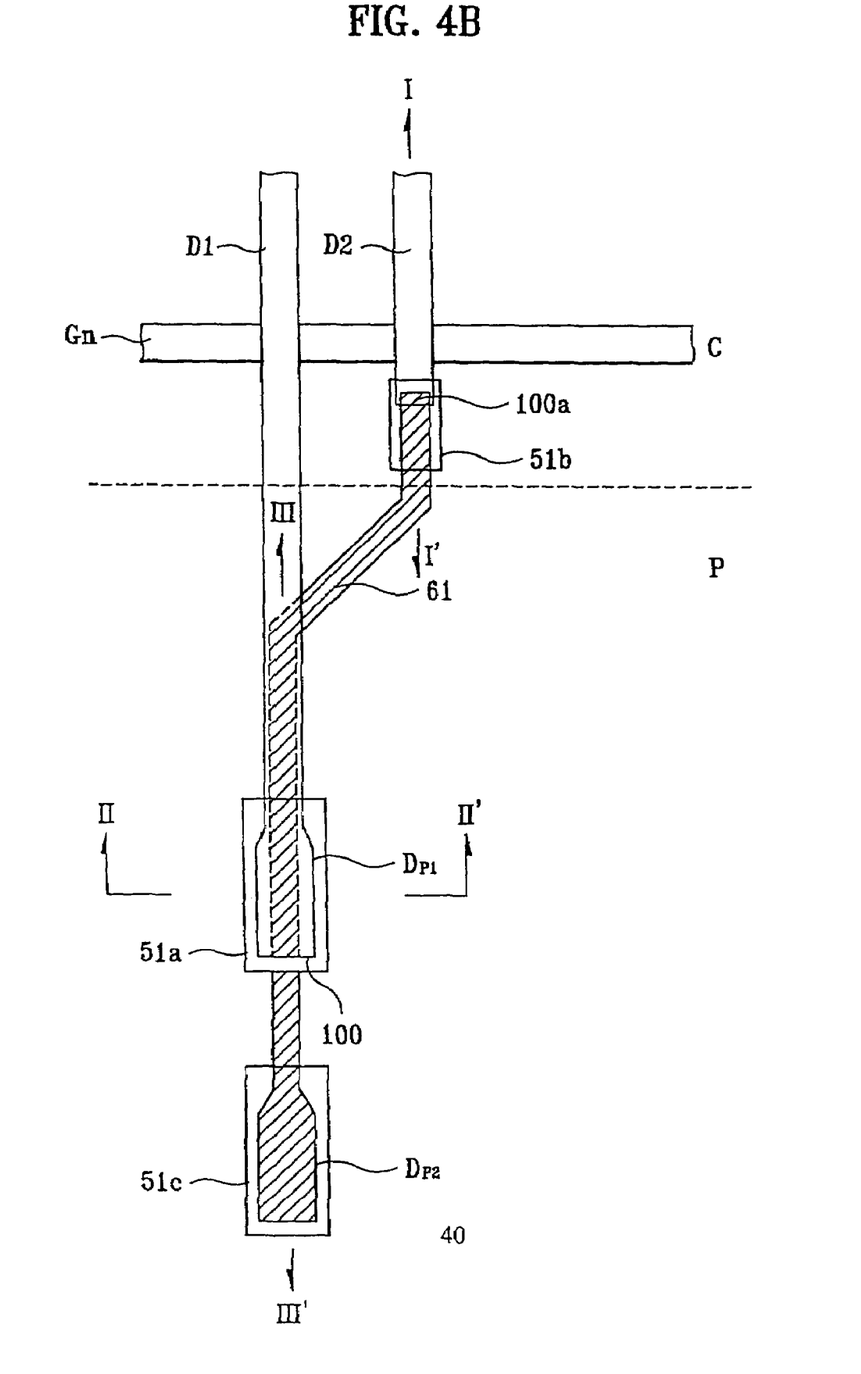
FIG. 4B illustrates an enlarged view of the dotted part A in FIG. 4A.
Figure 5A:
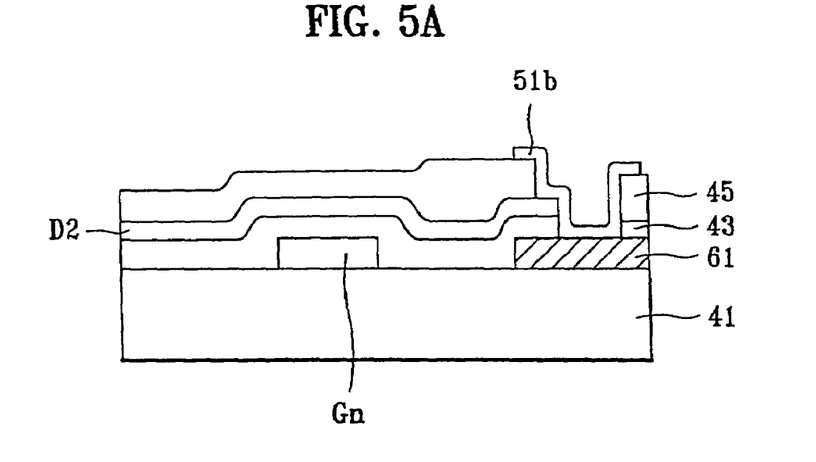
FIG. 5A is a sectional view of the LCD panel in FIG. 4A taken along line I-I' in FIG. 4B.
Figure 5B:
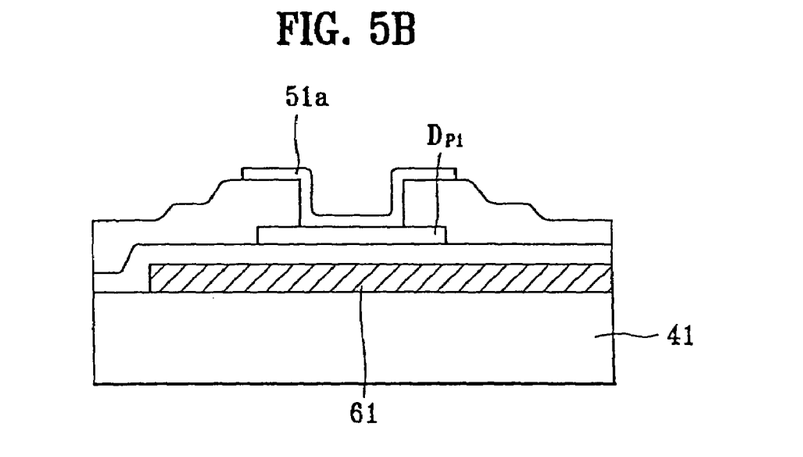
FIG. 5B is a sectional view of the LCD panel in FIG. 4A taken along line II-II' in FIG. 4B.
Figure 5C:
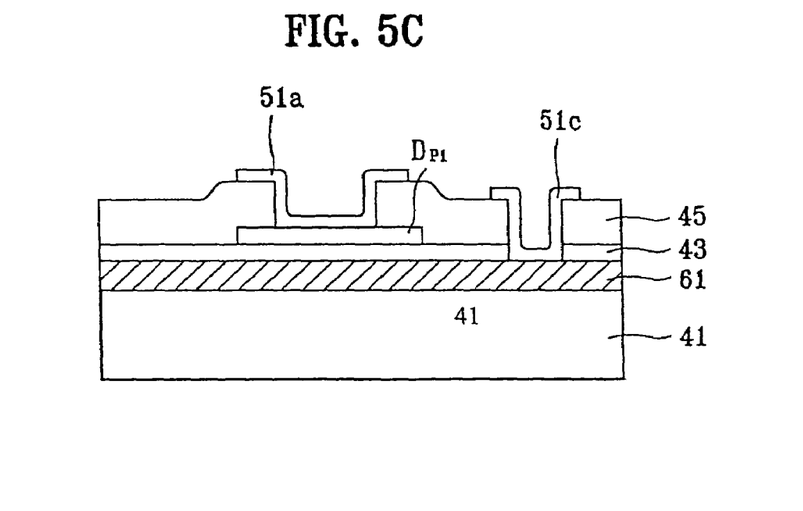
FIG. 5C illustrates a sectional view of the LCD panel in FIG. 4A taken along line III-III' in FIG. 4B.
Figure 6A:
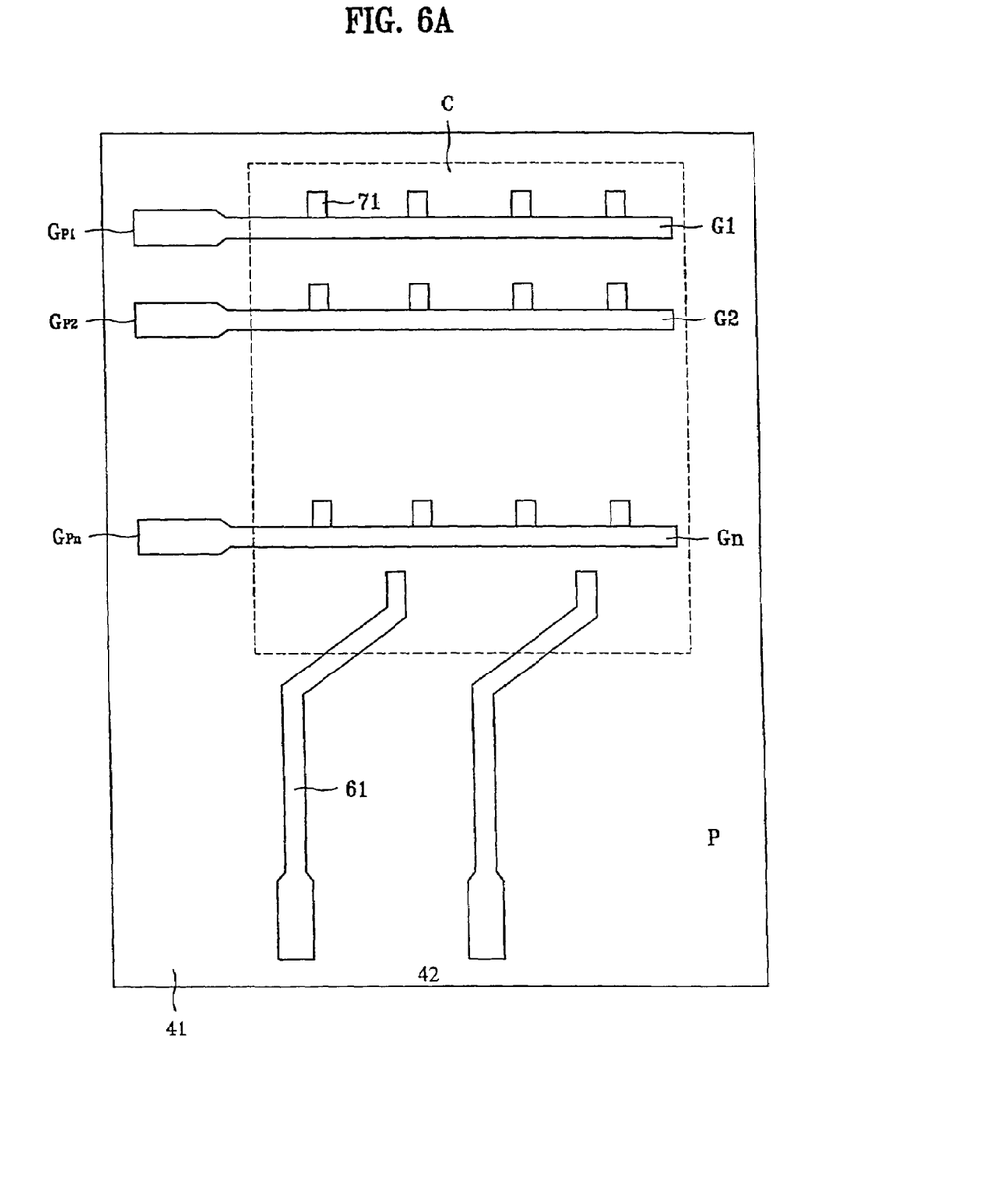
FIGS. 6A to 6C are sectional views illustrating a method for manufacturing an LCD panel according to a first embodiment of the present invention.
Figure 6B:
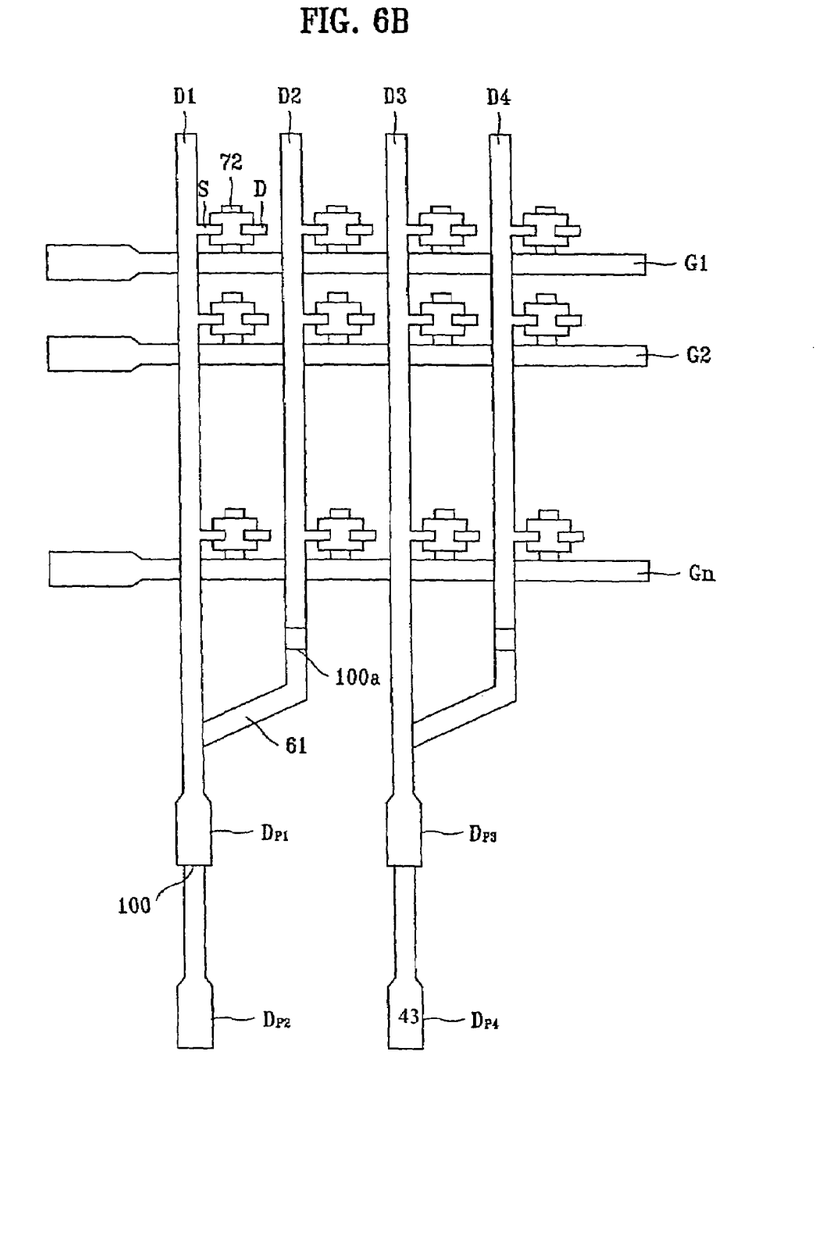
Figure 6C:
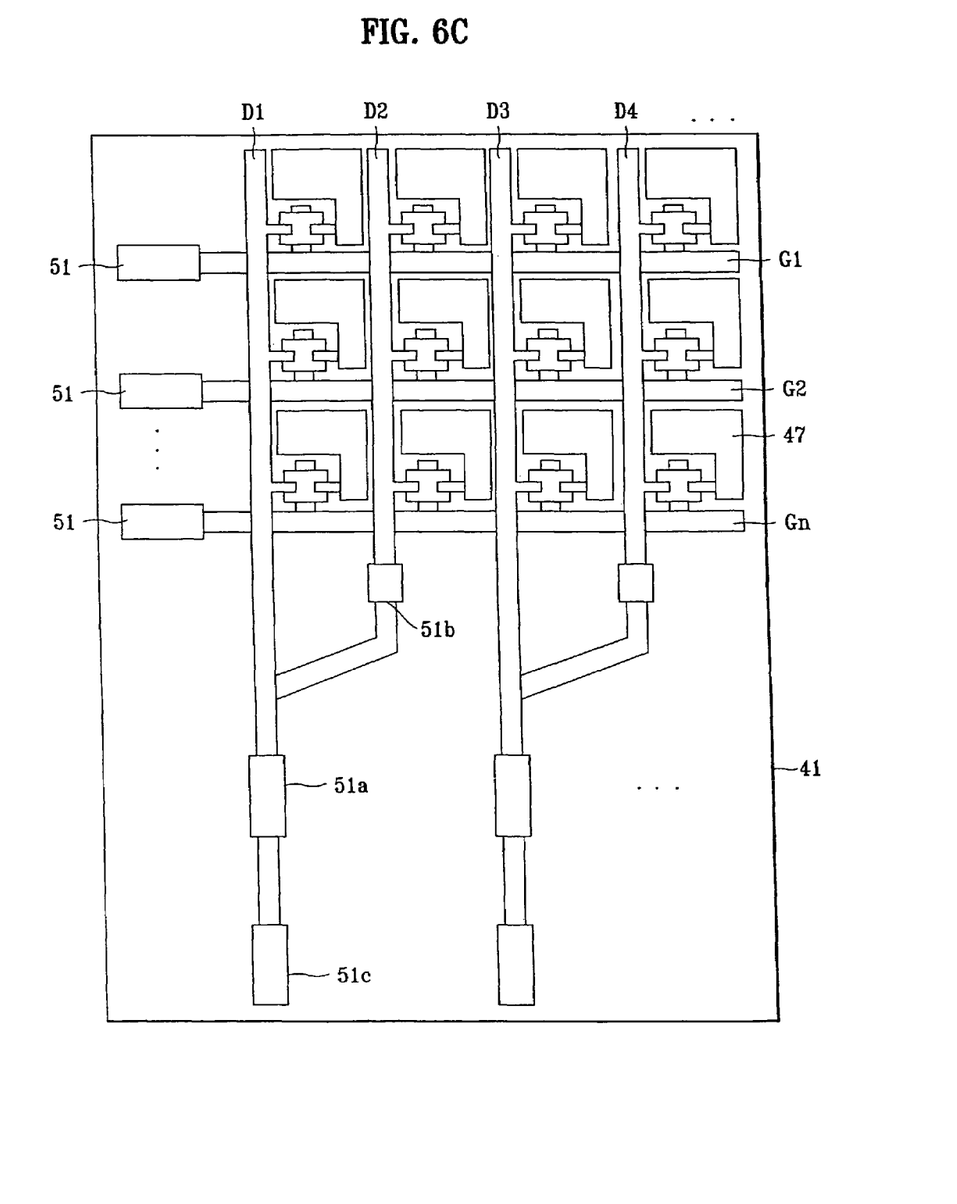

A first embodiment of the present invention is discussed hereinbelow with reference to FIGS. 4A-4B, 5A-5C, and 6A-6C. FIG. 4A illustrates a plane view of an LCD panel according to the first embodiment of the present invention; FIG. 4B illustrates an enlarged view of the dotted part A (i.e., a part of a data pad region) in FIG. 4A; FIG. 5A is a sectional view of the LCD panel in FIG. 4A taken along line I-I' in FIG. 4B; FIG. 5B is a sectional view of the LCD panel in FIG. 4A taken along line II-II' in FIG. 4B; FIG. 5C illustrates a sectional view of the LCD panel in FIG. 4A taken along line III-III' in FIG. 4B; and FIGS. 6A to 6C are sectional views illustrating a method for manufacturing an LCD panel according to the first embodiment of the present invention;

As shown in FIG. 4A, an LCD panel in the first embodiment includes a first substrate (i.e., the substrate 41) defined with a cell region C and a pad region P; a plurality of gate lines G1, G2, . . . , Gn (where n is even) on the cell region C in a same direction; a plurality of gate pads Gp1, Gp2, . . . ,Gpn extended from the respective gate lines G1, G2, . . . , Gn and formed on a gate pad region; a plurality of data lines D1, D2, . . . ,Dn crossing the gate lines G1, G2, . . . ,Gn; a first set of data pads (or "first data pads") Dp1, Dp3, Dp5, . . . ,Dpn-1 extended from the odd numbered data lines D1, D3, . . . , Dn-1 and formed in a data pad region; a second set of data pads (or "second data pads") Dp2, Dp4, . . . , Dpn connected to the even-numbered data lines D2, D4, . . . , Dn. The data pads in the second set of data pads are formed at a level below that of the first set of data pads Dp1, Dp3, . . . , Dpn-1 along the direction of respective data lines D1, D3, . . . , Dn-1 and parallel to the first data pads Dp1, Dp3, . . . , Dpn-1 as illustrated in FIG. 4A.

A transparent conductive film 51 may be formed to electrically connect respective gate pads and data pads to a Tape Carrier Package (TCP) (not shown) or Chip On Film (COF) package (not shown). In the discussion given herein, for convenience, a reference numeral "51a" denotes a transparent conductive film connected to the odd numbered data pads, and the same reference numeral is used to designate a first transparent conductive film. Similarly, a reference numeral "51b" denotes a transparent conductive film that electrically connects conductive patterns 61 (described in more detail hereinbelow) to the even numbered data lines (see FIG. 4B) and the same reference numeral is used to designate a second transparent conductive film. Finally, a reference numeral "51c" denotes a transparent conductive film connected to an end part of the conductive patterns 61 (FIG. 4B) and the same reference numeral is used to designate a third transparent conductive film.

As shown in FIG. 4B, the even numbered data lines D2, D4, . . . ,Dn are extended only up to the cell region C, and the conductive patterns 61 (see FIG. 4B) connected to the even numbered data lines D2, D4, . . . Dn are refracted to the odd numbered data lines D1, D3, . . . Dn-1 so that each conductive pattern 61 is extended up to the pad region P. The refracted conductive patterns 61 pass through a lower portion of the first data pads Dp1, Dp3, . . . ,Dpn-1.

As shown in FIG. 4A, the first data pads Dp1, Dp3 . . . Dpn-1 and the second data pads Dp2, Dp4 . . . Dpn are arranged at upper and lower portions of the substrate 41 respectively. The distance between adjacent first data pads Dp1, Dp3 . . . Dpn-1 which are arranged at an upper portion of the substrate 41 is at least two times the distance between adjacent data lines D1, D2. Dn. This means that the pitch between the data lines can be substantially decreased and thus an LCD panel of high resolution can be obtained. This is in contrast to the prior art LCD panels which can not decrease the pitch between data lines by pads.

The first data pads are formed in a single body with the odd numbered data lines D1, D3 . . . Dn-1, and an end part 100 of the odd-numbered data lines D 1, D3, . . . Dn-1 is connected to a first transparent conductive film 51a. On the other hand, in the case of the second data pads Dp2, Dp4, . . . Dpn, the even numbered data lines D2, D4 . . . Dn are extended only up to the cell region C and the conductive patterns 61 are then overlapped with an end part 100a of the even numbered data lines D2, D4, . . . , Dn. The conductive patterns 61 are then extended so as to refract them to the first data pads Dp1, Dp3, . . . , Dpn-1 and then pass through a lower portion of the first data pads Dp1, Dp3, . . . , Dpn-1 as illustrated in FIG. 4B.

An end part 100a of each even numbered data lines D2, D4 . . . Dn is electrically connected to the corresponding conductive pattern 61 by the second transparent conductive film 51b, and an opposite end part of each conductive pattern 61 is connected to a third transparent conductive film 51c through a contact hole as shown in FIG. 4B.

The first, second, and third transparent conductive films (51a, 51b, and 51c respectively) may formed at the same time when the pixel electrodes 47 (FIG. 4A) are formed in the cell region C.

An arrangement of data pads according to the present invention is now explained in detail with reference to FIGS. 5A-5C. As shown in FIGS. 5A to 5C, an LCD panel according to the present invention includes a gate line Gn and a conductive pattern 61 (which will be later connected to a corresponding even numbered data line) formed on the first substrate 41. Thereafter, a gate insulating layer 43 may be formed on the substrate surface including the conductive pattern 61. Then, a data line D2 is formed on the gate insulating layer 43 to cross the gate line Gn and a data pad Dp1 is extended from a data line D1 (FIG. 5B) that is formed adjacent to the data line D2 (or "ahead" or "in front" of it when FIGS. 5A-5C are viewed in three dimensions).

A passivation film 45 may then be formed on the entire substrate surface including the data line D2 and the data pad Dp1. Also, the first, second, and third transparent conductive films (51a, 51b, and 51c respectively) may be formed above the passivation film 45 as illustrated in FIGS. 5A-5C. The first transparent conductive film 51a is connected to an end part 100 of the odd numbered data pad Dp1, and the second transparent conductive film 51b connects an end part 100a of the even numbered data line D2 to an end part of the adjacent conductive pattern 61 as shown in FIG. 4B. Also, the third transparent conductive film 51c is connected to an opposite end part of the conductive pattern 61 as shown in FIG. 4B.

A method for manufacturing an LCD panel according to this first embodiment of the present invention is now explained with reference to the processing layouts shown in FIGS. 6A to 6C. As shown in FIG. 6A, gate lines G1, G2 . . . Gn; gate electrodes 71; and conductive patterns 61 (which will later be connected to the even numbered data lines) are initially formed on the substrate 41. At this time, the conductive patterns 61 are formed from the pad region P to a predetermined length into the adjacent cell region C. A portion of the conductive patterns 61 is refracted to the odd numbered data lines as shown in FIG. 6A.

Subsequently, as shown in FIG. 6B, a gate insulating layer (not shown) is formed on the substrate surface including the gate lines G1, G2, . . . , Gn, the gate electrodes 71 and the conductive patterns 61. A semiconductor layer 72 is then formed on the gate insulating layer and data lines D1, D2, D3 . . . Dn (crossing the gate lines G1, G2, . . . ,Gn) and source/drain electrodes (S/D) are formed on the semiconductor layer 72.

Thereafter, although not shown in FIG. 6B, a passivation film is formed on the substrate surface including the data lines D1, D2, D3, . . . , Dn, and source/drain electrodes (S/D). The passivation film is then patterned so as to expose end parts 100 of the odd numbered data lines D1, D3 . . . Dn−1; end parts 100a of the even numbered data lines D2, D4, . . . ,Dn; end parts (adjacent to the end parts 100a) of the conductive patterns 61; and opposite end parts (which are collinear with the odd-numbered data lines D1, D3, . . . ,Dn−1) of the conductive patterns 61.

Finally, as shown in FIG. 6C, pixel electrodes 47 are formed in a pixel region defined by the gate lines G1, G2 . . . Gn and the data lines D1, D2 . . . Dn. Thereafter, the first, second, and third transparent conductive films (51a, 51b, and 51c respectively) are formed. The first transparent conductive film 51a is connected to the end parts 100 of the odd numbered data lines D1, D3, . . . Dn−1. The second transparent conductive film 51b electrically connects the end parts 100a of the even numbered data lines D2, D4 . . . Dn to the respective end parts of adjacent conductive patterns 61 as shown. Also, the third transparent conductive film 51c is connected to the opposite end parts of the conductive patterns 61.

Second Embodiment

Figure 7:
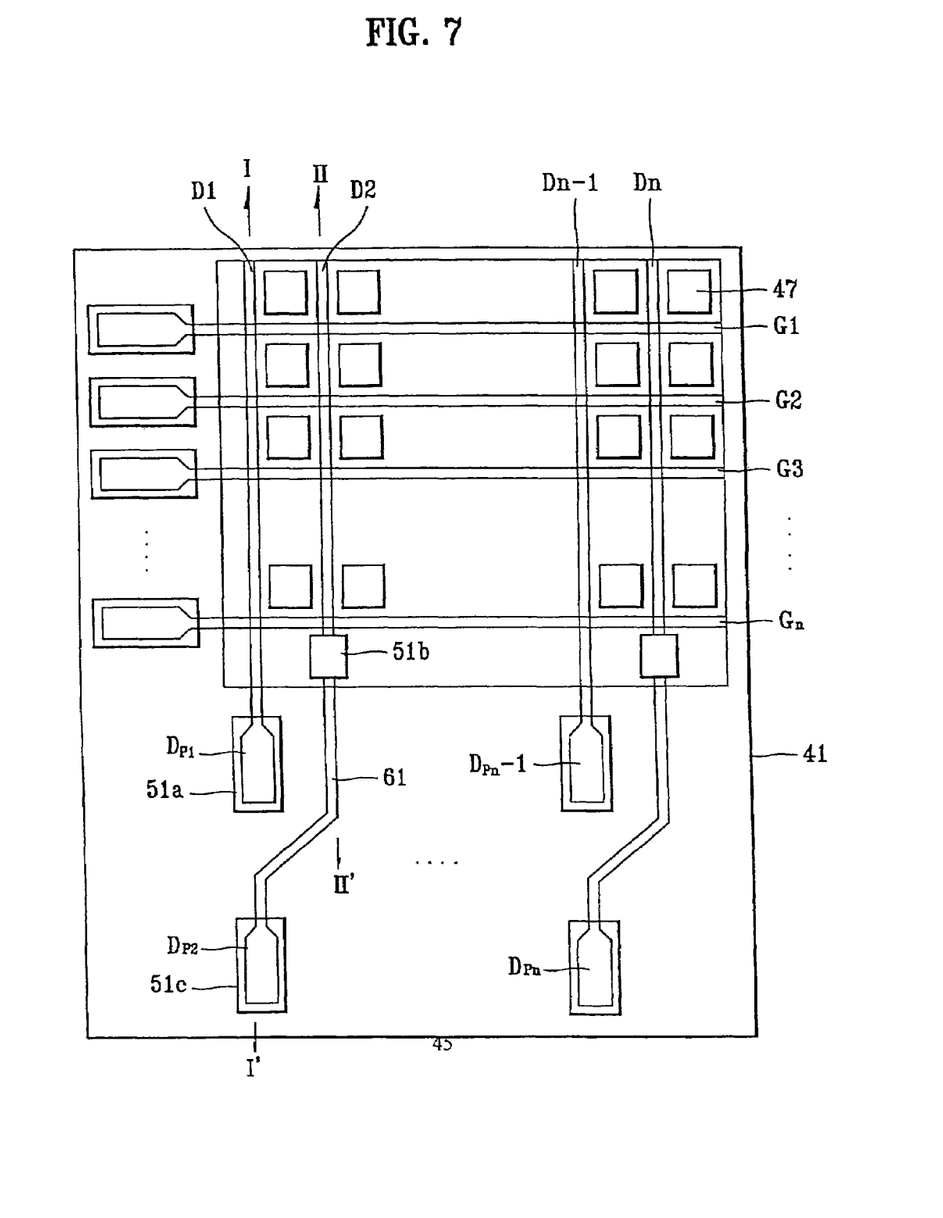
FIG. 7 illustrates a plane view of an LCD panel according to a second embodiment of the present invention.

FIG. 7 is a plane view of an LCD panel according to a second embodiment of the present invention, which is compared hereinbelow with the first embodiment of the present invention. As discussed hereinbefore, in the first embodiment of the present invention, the even numbered data lines are formed only up to the cell region C and then extended up to the pad region P using the conductive patterns 61. Also, in the first embodiment, the extensions of the even numbered data lines, extended using the conductive patterns 61, pass through a lower portion of the first set of data pads Dp1, Dp3 . . . Dpn−1. On the other hand, in the second embodiment of the present invention, the conductive patterns 61 are placed on one side of the first data pads Dp1, Dp3 . . . Dpn−1, and no portion of the conductive patterns 61 is placed perpendicularly below the first set of data pads (as in the first embodiment).

As shown in FIG. 7, the conductive patterns 61 terminate at a longer distance into the pad region P than the odd numbered data lines. The conductive patterns 61 may be refracted to the odd numbered data lines. The refracted portion of the conductive patterns 61 may start from a location in the pad region P that is parallel to the end points of the first data pads Dp1, Dp3 . . . Dpn−1 and end at a location that is in line with the longitudinal direction of the corresponding odd-numbered data line as shown in FIG. 7. In this manner, the second data pads Dp2, Dp4 . . . Dpn, which are extended from the conductive patterns 61, get arranged in parallel to the first data pads Dp1, Dp3 . . . Dpn−1. The pitch value for this second embodiment of the present invention may not be as good as that obtained in the first embodiment. However, since no portion of the conductive patterns 61 passes perpendicularly below the odd numbered data lines in this second embodiment, the signal interference between the first and the second sets of data pads is eliminated.

Figure 8A:
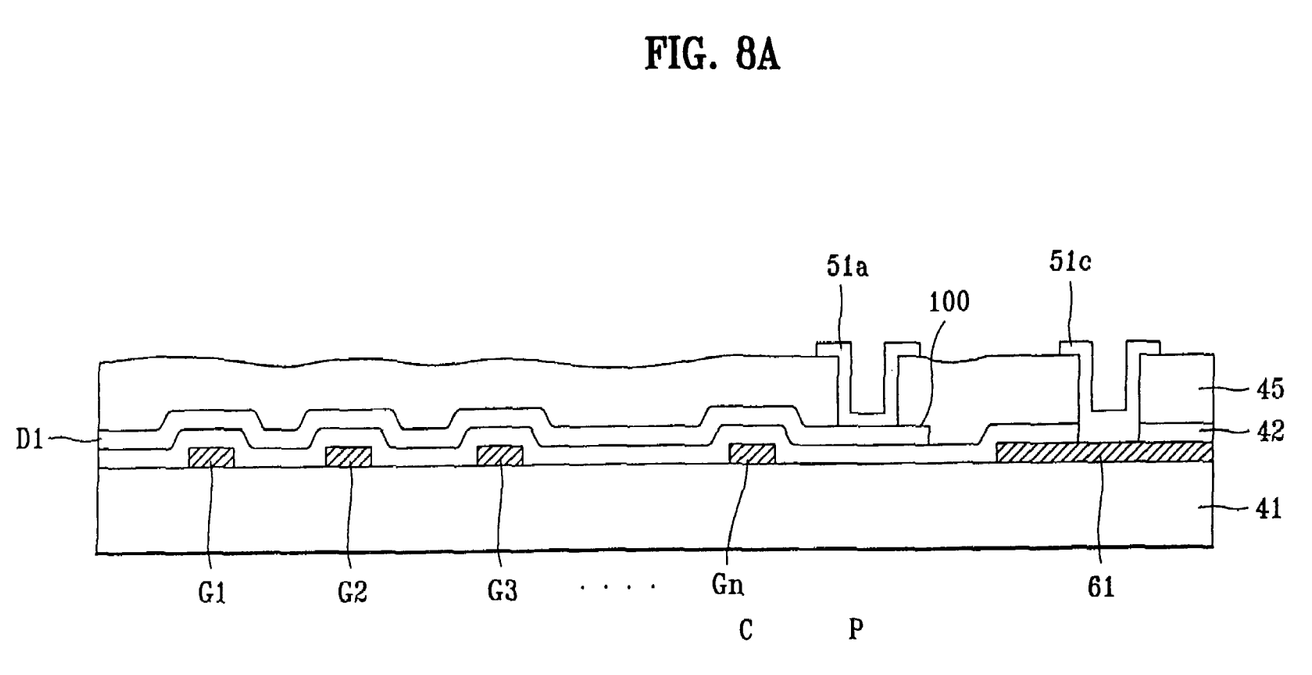
FIG. 8A illustrates a sectional view of the LCD panel in FIG. 7 taken along line I-I' in FIG. 7.
Figure 8B:
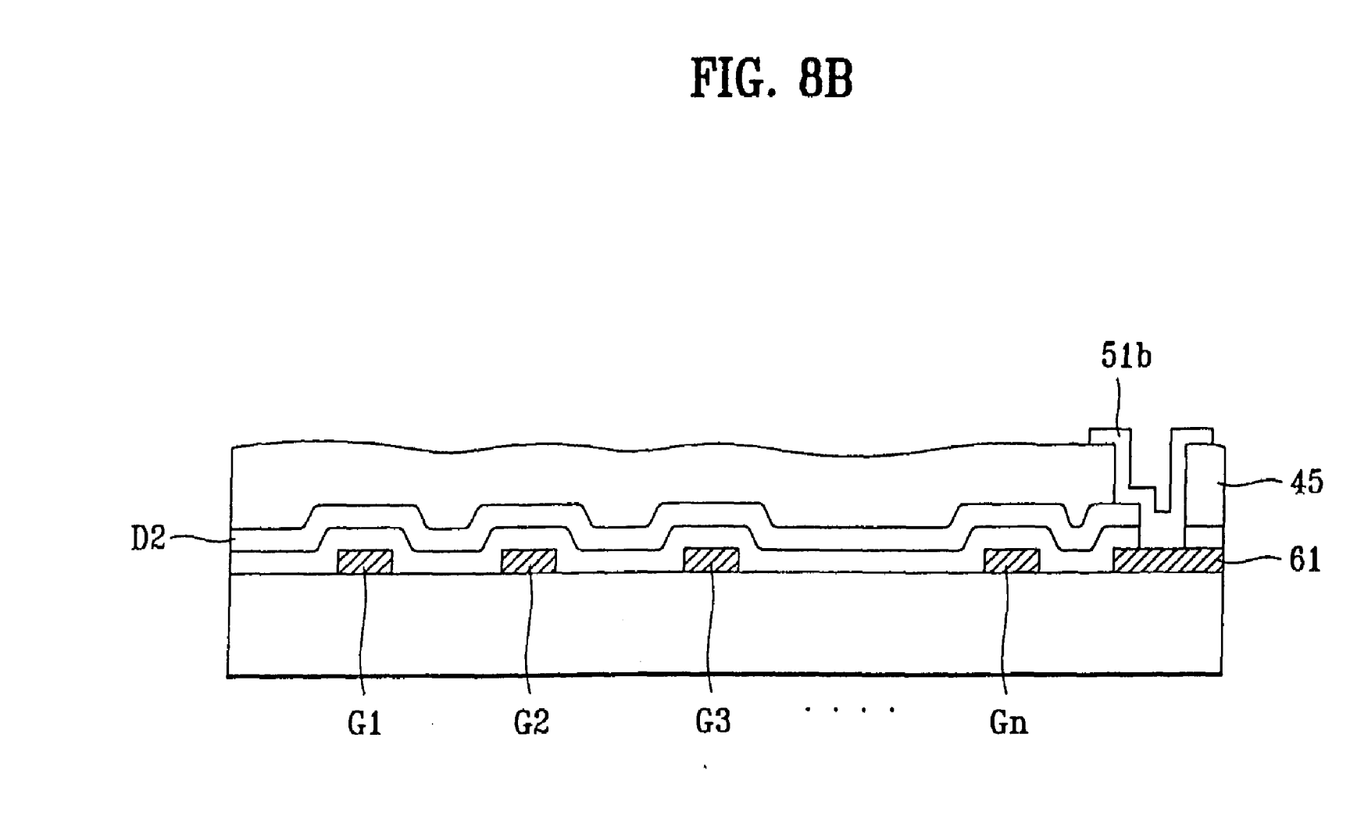
FIG. 8B illustrates a sectional view of the LCD panel in FIG. 7 taken along line II-II' in FIG. 7.

FIG. 8A illustrates a sectional view of the LCD panel in FIG. 7 taken along line I-I' in FIG. 7 and FIG. 8B illustrates a sectional view of the LCD panel in FIG. 7 taken along line 1'-II' in FIG. 7. As shown in FIGS. 8A and 8B, a plurality of gate lines G1, G2 . . . Gn is formed in the cell region C of the first substrate 41 with a predetermined fixed distance between any two gate lines, and a plurality of conductive patterns 61 is formed in the pad region P. A gate insulating layer 42 is then formed on the substrate surface including the conductive patterns 61 and the gate lines. Also, the data lines D1, D2, D3, . . . ,Dn are formed on the gate insulating layer 42 crossing the gate lines G1, G2, . . . ,Gn.

Subsequently, a passivation film 45 is formed on the substrate surface including the data lines D1 (FIG. 8A) and D2 (FIG. 8B). Thereafter, the first, second, and third transparent conductive films (51a, 51b, and 51c respectively) may be formed as illustrated in FIGS. 8A and 8B. The first transparent conductive film 51a is connected to an end part 100 of the data line D1, and the second transparent conductive film 51b electrically connects the conductive pattern 61 to the data line D2. The third transparent conductive film 51c is connected to an end part of the conductive pattern 61 as shown in FIG. 8A.

Third Embodiment

Figure 9:
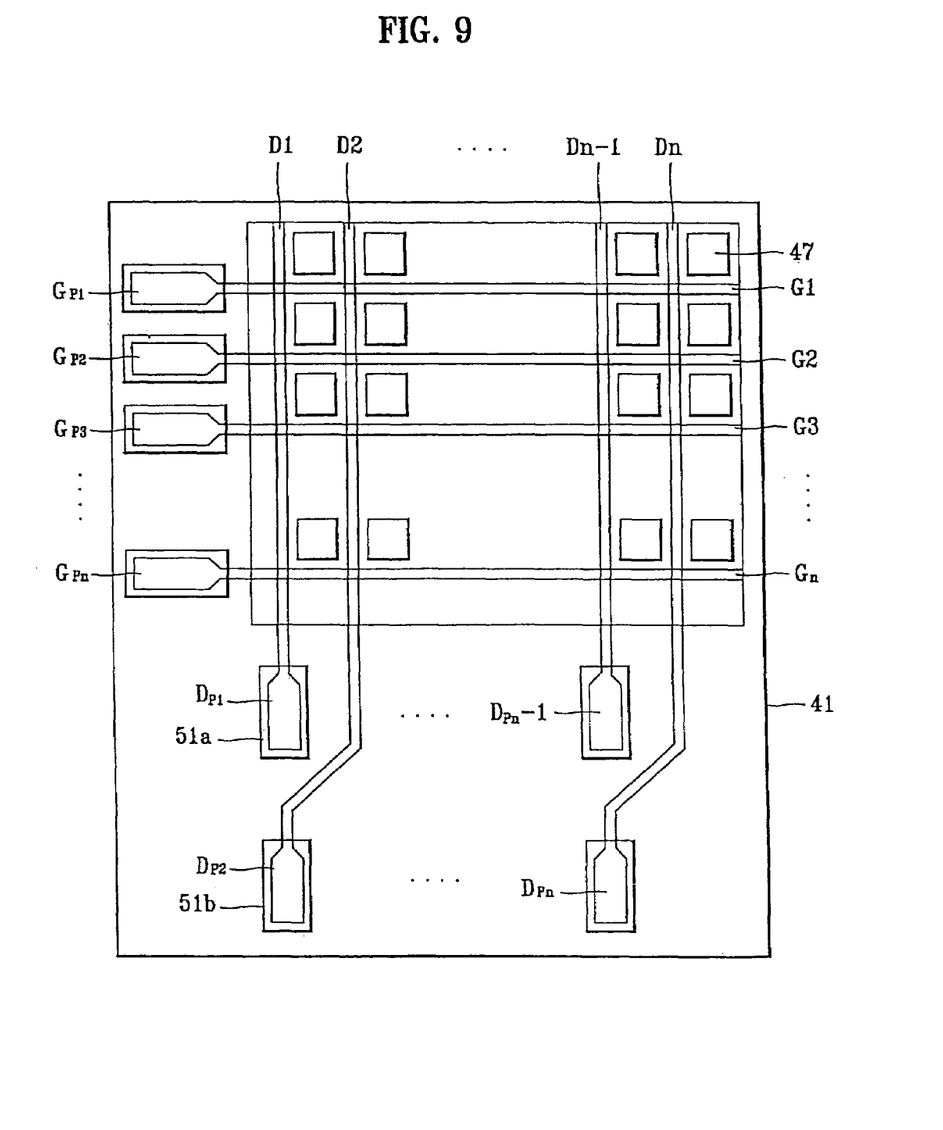
FIG. 9 illustrates a plane view of an LCD panel according to a third embodiment of the present invention.

FIG. 9 is a plane view of an LCD panel according to a third embodiment of the present invention. As discussed hereinbefore, in the first and second embodiments, separate conductive patterns are formed with gate lines, and, with the use of these conductive patterns, the even numbered data pads could be extended from the even numbered data lines and arranged parallel to the odd-numbered data pads along the longitudinal direction of odd-numbered data lines. On the other hand, as shown in FIG. 9, in the third embodiment of the present invention, the conductive patterns are not formed, but, instead, the even numbered data lines are made longer than the odd numbered data lines in the pad region of the substrate. Also, the even numbered data pads are arranged parallel to the odd numbered data pads along the longitudinal direction of the odd numbered data lines, thereby obtaining a maximum distance or separation between adjacent data lines but without any increase in pitch. Furthermore, the layout illustrated in FIG. 9 allows for convenient and accurate modular substrate fabrication process.

As per the discussion given hereinabove, it is noted that the transparent conductive film which connects to Tape Carrier Package (TCP) or Chip On Film (COF) is wider than the data lines. In the related art, transparent conductive films are arranged parallel along the longitudinal direction of the gate lines. However, in this third embodiment of the present invention, the transparent conductive films are separately arranged up and down along the longitudinal direction of the data lines, thereby obtaining a suitable distance or separation between adjacent transparent conductive films even if the pitch between two data lines is decreased.

In the above embodiments, a decreased pitch is obtained by changing positions of data pads connected to the even numbered data lines. However, it is noted that the same pitch may also be obtained by changing positions of the odd numbered data pads instead of the even numbered data pads in a manner similar to that discussed herienabove with reference to even numbered data pads.

The LCD panel of the present invention and the method for manufacturing the same have the following advantages. First, it is possible to obtain a reduced pitch sufficient to design an LCD panel of high resolution. Second, since data pads are arranged along only one side of the panel, a single bank structure is obtained. The single bank structure can be fabricated in a simple module process and can allow for a simple arrangement of driving circuitry, as compared to the double bank structure which arranges data pads on both sides of the panel. Therefore, in the single bank structure of the present invention, it is possible to obtain compact LCD panels with reduced production cost.

The forgoing embodiments are merely exemplary and are not to be construed as limiting the present invention. The present teachings can be readily applied to other types of apparatuses. The description of the present invention is intended to be illustrative, and not to limit the scope of the claims. It will be apparent to those skilled in the art that various modifications and variations can be made in the high resolution LCD panel and the method of manufacturing the same according to the present invention without departing from the spirit or scope of the invention. Thus, it is intended that the present invention cover the modifications and variations of this invention provided they come within the scope of the appended claims and their equivalents.

What is claimed is:

1. An LCD panel comprising:
   an insulating substrate defined as a cell region and a pad region, the pad region including data pads;
   a plurality of gate lines formed in the cell region; and
   a plurality of data lines crossing the gate lines and having alternately different extended lengths to the data pads, wherein alternately different extended lengths are also respectively at different levels above the insulating substrate, the data pads applying an electric signal to the data lines.

2. The LCD panel of claim 1, wherein the plurality of data lines includes a first set of data lines and a second set of data lines formed in the cell region, and
   wherein the data pads include:
   a first set of data pads formed in the pad region, wherein each data pad in the first set of data pads extends from a corresponding one of the first set of data lines; and
   a second set of data pads formed in the pad region, wherein the first and second set of data pads are arranged in a single-bank structure in the pad region, wherein each data pad in the second set of data pads is electrically connected to a corresponding one of the second set of data lines, and wherein the first and the second set of data pads are arranged so that a plane substantially perpendicular to the substrate and substantially parallel to a data line in the first set of data lines contacts a data pad in the first set of data pads and a data pad in the second set of data pads.

3. The LCD panel of claim 2, wherein the first set of data lines includes all odd-numbered data lines in the plurality of data lines, and wherein the second set of data lines includes all even-numbered data lines in the plurality of data lines.

4. The LCD panel of claim 2, wherein each data pad in the second set of data pads includes:
   a conductive pattern having a first end in the cell region and a second end in the pad region, wherein the longitudinal axis of the second end corresponds with that of the adjacent one of the first set of data lines, wherein the conductive pattern is formed on the substrate at a level below that of an adjacent one of the first set of data pads and wherein the first end is connected to the corresponding one of the second set of data lines; and
   a first conductive film connected to the second end of the conductive pattern.

5. The LCD panel of claim 4, wherein the conductive pattern is formed in one of the following parts on the substrate;
   a first part where at least a portion of the conductive pattern falls perpendicularly below the adjacent one of the first set of data pads; and
   a second part where no portion of the conductive pattern falls perpendicularly below the adjacent one of the first set of data pads.

6. The LCD panel of claim 5, wherein the conductive pattern in the second part is formed on one or more sides of the adjacent one of the first set of data pads.

7. The LCD panel of claim 4, wherein the conductive pattern includes a refracted portion linking the first and the second ends thereof.

8. The LCD panel of claim 4, wherein the conductive pattern is of the same material as that of the plurality of gate lines.

9. The LCD panel of claim 4, further comprising an insulating layer interposed between the conductive pattern and the adjacent one of the first set of data pads located above the conductive pattern.

10. The LCD panel of claim 4, further comprising a second conductive film connecting the first end of the conductive pattern to the corresponding one of the second set of data lines.

11. The LCD panel of claim 4, wherein the conductive pattern has the same width as that of the corresponding one of the second set of data lines.

12. The LCD panel of claim 2, wherein a spacing between two consecutive data pads in the first set of data pads is at least two times that between two consecutive data lines in the plurality of data lines.

13. The LCD panel of claim 2, further comprising a plurality of thin film transistors, wherein each thin film transistor is formed at a crossing point between a corresponding gate line from the plurality of gate lines and a corresponding data line from the plurality of data lines.

14. The LCD panel of claim 2, further comprising a plurality of pixel electrodes, wherein each pixel electrode is formed in a corresponding pixel region from the plurality of pixel regions.

15. The LCD panel of claim 2, wherein each data line in the second set of data lines comprises the following:
   an extension portion formed a predetermined distance into the pad region; and
   a refracted portion formed in the pad region, wherein the refracted portion commencing at an end of the extension portion in the pad region and terminating as a corresponding data pad in the second set of data pads.

16. The LCD panel of claim 15, wherein the end of the extension portion in the pad region is coextensive with an adjacent data pad from the first set of data pads.

17. The LCD panel of claim 2, wherein the first and second sets of data pads are arranged so that the plane substantially perpendicular to the substrate coincides with a data line in the first set of data lines.

* * * * *